UNITED STATES PATENT OFFICE.

PETER C. VOGELLUS, OF GLOUCESTER, MASSACHUSETTS.

PROCESS OF EXTRACTING OILS AND FATS FROM FISH.

SPECIFICATION forming part of Letters Patent No. 294,940, dated March 11, 1884.

Application filed July 6, 1883. (No specimens.)

*To all whom it may concern:*

Be it known that I, PETER C. VOGELLUS, a subject of the King of Denmark, residing at Gloucester, in the county of Essex and State of Massachusetts, have invented certain new and useful Improvements in Processes for Extracting Oils and Fats from Fish; and I do declare the following to be a full, clear, and exact description of the invention, such as will enable others skilled in the art to which it appertains to make and use the same.

My improved process has for its object to overcome the difficulty experienced in extracting oils from fish by reason of the water contained in the latter when solvents are used as the extracting agent. It is common to use solvents to extract oils from fish, as well as other bodies; but in the application thereof to fish the water contained in the fish prevents the solvents from coming into ready contact will all particles of oil, so that the latter is wasted. This is particularly the case where the oil is present in but small quantities. In order to overcome this difficulty, I subject the fish to the action of an absorbent substance—such, for instance, as plaster-of-paris, which will absorb the water without affecting the oil—and then apply the solvents, which as the water is removed now has contact with every particle of the oil, and dissolves the same. Ordinarily good results are had where the fish are whole; but in some cases where the fish have thick tough skins—such as dog-fish—it is desirable to cut them up before subjecting them to the before-described process. Good results are had by the steps before described; but in practice I prefer to cook or heat the fish, and at the same time subject them to the action of the absorbent, and then to the action of the solvents. This heating throws off considerable of the water, requiring the use of less paster-of-paris, as well as causing the fish to fall to pieces, which is desirable, as it gives the solvents better access to the interior parts of the fish.

My process, it will be understood, is equally applicable to the whole fish or to the livers, heads, or other separate parts thereof.

The solvents may be any of those usually employed, such as hydrocarbon oils, chloride of methyl, bisulphide of carbon, or any of the other solvents well known to the art.

The oil may be separated from the solvents by any of the well-known processes of evaporation or distillation, the description of which seems unnecessary here.

Having thus described my invention, what I claim, and desire to secure by Letters Patent, is—

1. The improved process of extracting oils from fish, consisting in subjecting the fish to the action of plaster-of-paris or some similar water-absorbing agent, whereby the water is removed therefrom, and then mingling the fish with a suitable solvent, whereby the oil in the fish is dissolved, substantially as described.

2. The improved process of extracting oils from fish, consisting in heating the fish, subjecting the same to water-absorbing agents, and then to the dissolving action of solvents, substantially as described.

3. In the process of extracting oil from fish, the subjection of the latter to the water-absorbing action of plaster-of-paris or equivalent absorbents, substantially as specified.

In testimony whereof I affix my signature in presence of two witnesses.

PETER C. VOGELLUS.

Witnesses:
S. BENTON BORAY,
GEORGE FRIEND.